US007055718B2

(12) United States Patent
Jensen

(10) Patent No.: US 7,055,718 B2
(45) Date of Patent: Jun. 6, 2006

(54) TICKET DISPENSER DRAWER

(75) Inventor: Craig Jensen, Adel, IA (US)

(73) Assignee: Schafer Systems Inc., Adair, IA (US)

( * ) Notice: Subject to any disclaimer, the term of this patent is extended or adjusted under 35 U.S.C. 154(b) by 150 days.

(21) Appl. No.: 10/776,495

(22) Filed: Feb. 11, 2004

(65) Prior Publication Data

US 2005/0184081 A1 Aug. 25, 2005

(51) Int. Cl.
*G06F 11/16* (2006.01)

(52) U.S. Cl. ........................ 221/310; 221/255; 221/303

(58) Field of Classification Search .................. 221/26, 221/45, 255, 260, 303, 307, 310
See application file for complete search history.

(56) References Cited

U.S. PATENT DOCUMENTS

| | | | | |
|---|---|---|---|---|
| 978,052 | A | | 12/1910 | Oehring |
| 1,339,823 | A | * | 5/1920 | Harbaugh .................. 312/34.7 |
| 2,668,022 | A | * | 2/1954 | Fairfield .................. 242/419.4 |
| 2,887,247 | A | | 5/1959 | Williams, Jr. |
| 3,978,958 | A | | 9/1976 | Zandstra |
| 4,204,618 | A | * | 5/1980 | Reed et al. ................. 225/106 |
| 4,738,384 | A | * | 4/1988 | Tigner ......................... 225/16 |
| 4,982,337 | A | | 1/1991 | Burr et al. |
| 5,100,038 | A | | 3/1992 | Schafer |
| 5,222,624 | A | | 6/1993 | Burr et al. |
| 5,287,980 | A | * | 2/1994 | Saltz ......................... 220/4.27 |
| 5,383,572 | A | | 1/1995 | Mrajca |
| 5,399,005 | A | | 3/1995 | Schafer |
| 6,230,926 | B1 | | 5/2001 | Schafer et al. |

* cited by examiner

*Primary Examiner*—Khoi H. Tran
(74) *Attorney, Agent, or Firm*—G. Brian Pingel; Camille L. Urban

(57) ABSTRACT

A drawer for the storage, display, and dispensing apparatus for dispensing tickets of various sizes without the use of moving parts. The dispensing apparatus includes a bin for storing tickets and a dispensing slot utilizing tension arms to guide and control the dispensing of tickets.

20 Claims, 6 Drawing Sheets

TICKET DISPENSER DRAWER

BACKGROUND OF THE INVENTION

1. Field of the Invention

The present invention relates in general to an apparatus for the display and dispensing of lottery tickets and more specifically to such apparatus that utilizes tension arms to guide tickets through a dispenser.

2. Description of the Prior Art

It is known in the art to store and dispense lottery tickets for instant lottery games. Such tickets are sold in a variety of retail establishments and are commonly found in grocery stores and convenience stores. Lottery tickets are often dispensed manually by the simple process of detaching a ticket or tickets from a ticket pack, according to the requirements of the ticket purchaser. However, with a variety of different types of instant lottery games now being offered, it has become commonplace for establishments selling such tickets to use different types of ticket display and dispensing devices for the tickets. A problem with previous devices has been the dispensing of tickets of various thicknesses. The tension on the ticket must be great enough to prevent the ticket from falling out of the dispenser, but not so great that the ticket becomes stuck in the dispensing slot.

Means of providing an efficient and effective device for the dispensing and accounting of tickets that are sold are disclosed in U.S. Pat. Nos. 5,383,572; 3,978,958; 4,982,337; and 5,222,624. Although such vending devices appear to be highly efficient in dispensing and accounting lottery tickets, they are expensive to purchase, relatively complex to operate and maintain, and take up more space than is normally available for ticket dispensing devices. U.S. Pat. No. 6,230,926 B1 discloses a relatively inexpensive alternative to the previously listed devices, but other than a friction roller used as means to account for the number of tickets sold, the device has no means to guide the tickets through the dispenser and aid in separation of series connected tickets.

Box-like ticket dispensers with tension-governed exits are shown in U.S. Pat. Nos. 978,052; 2,887,247; 4,738,384; 5,100,038; and 5,399,005. While the devices disclosed in these patents utilize tension to dispense tickets, all of them are more complex than the present invention, requiring springs, rollers and/or manual adjustments in order to properly function. These parts suffer from wear as tickets are dispensed, and require servicing to restore the device to proper function.

One objective of the present invention is to provide a space saving structure with simplified means for providing continual proper tension on lottery tickets as they are drawn through the dispensing slot, without need for springs, moving parts, manual adjustments, or servicing.

A second objective is to provide a structure at lower manufacturing cost with fewer maintenance needs.

A third objective of the present invention is to provide a drawer to accommodate tickets of varying thicknesses.

SUMMARY OF THE INVENTION

The present invention provides for the storage, display, and dispensing of various types of lottery tickets that have varying thicknesses. The ticket dispensing apparatus of the present invention includes a drawer for storing a pack of tickets, a ticket holding bin, and a ticket dispensing assembly utilizing tension arms which guide tickets through the apparatus. Because the tension arms are flexible, tickets of varying thicknesses experience tension without becoming stuck in the slot.

One of the advantages of the present invention is that it is of a simple design that does not wear like rollers, requires no moving parts like springs or rollers, costs less to produce and maintain, and lasts longer before requiring replacement.

Another advantage of the present invention is that the dispensing slot can accommodate tickets of various thicknesses due to the use of resilient tension arms.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter, which the inventor does regard as his invention, is particularly pointed out and distinctly claimed in the claims at the conclusion of this specification.

DETAILED DESCRIPTION OF THE PREFERRED EMBODIMENT

Figure 1:
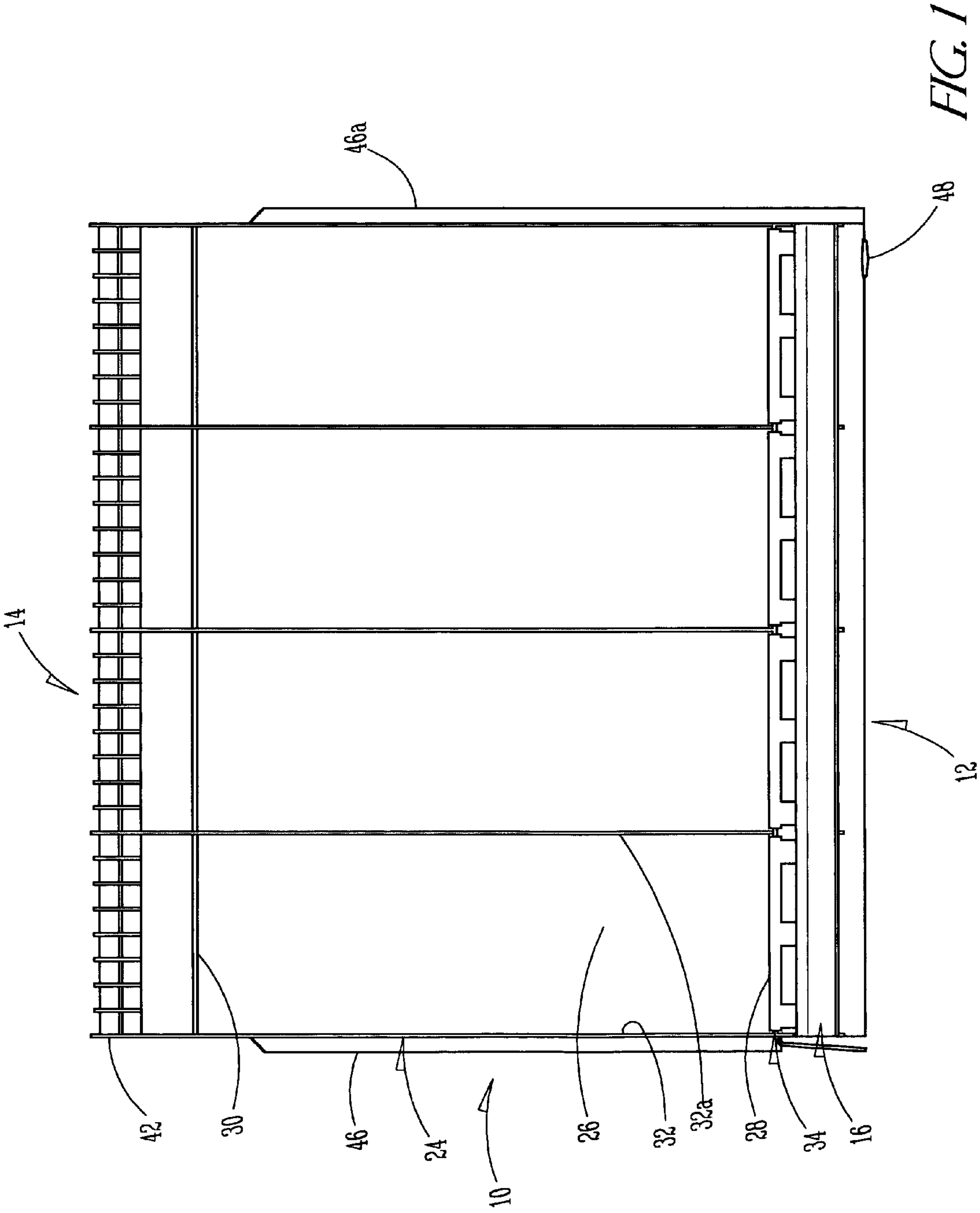
FIG. 1 is a top plan view of the preferred embodiment of a ticket dispenser.
Figure 2:
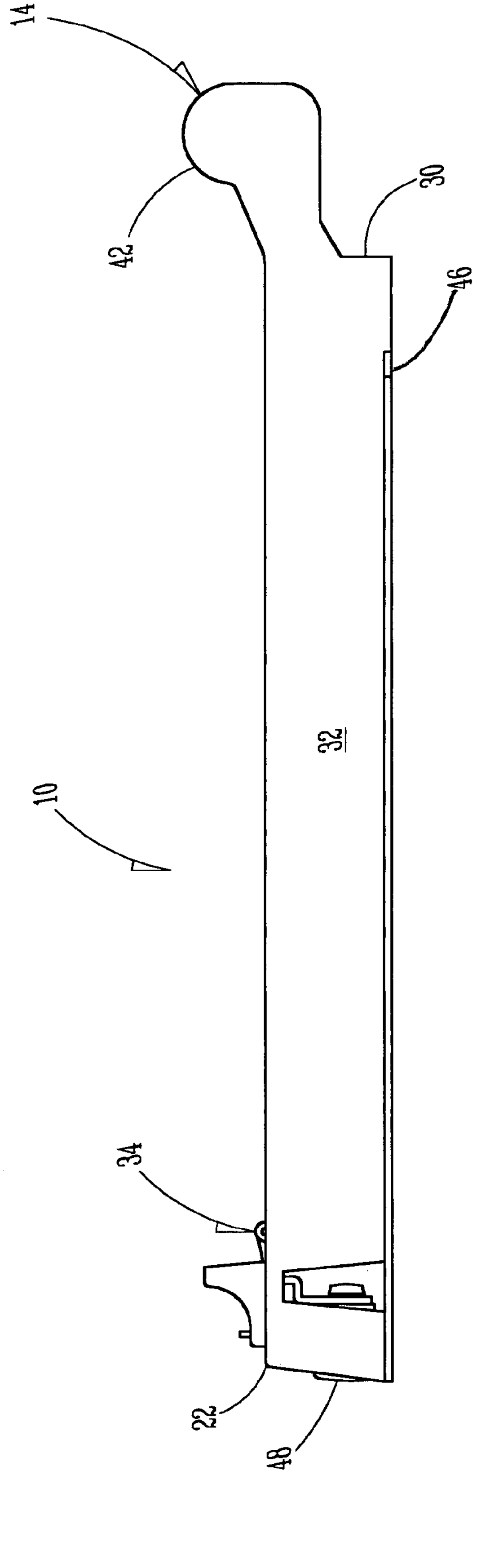
FIG. 2 is a side view in elevation of the ticket dispenser of FIG. 1.
Figure 4:
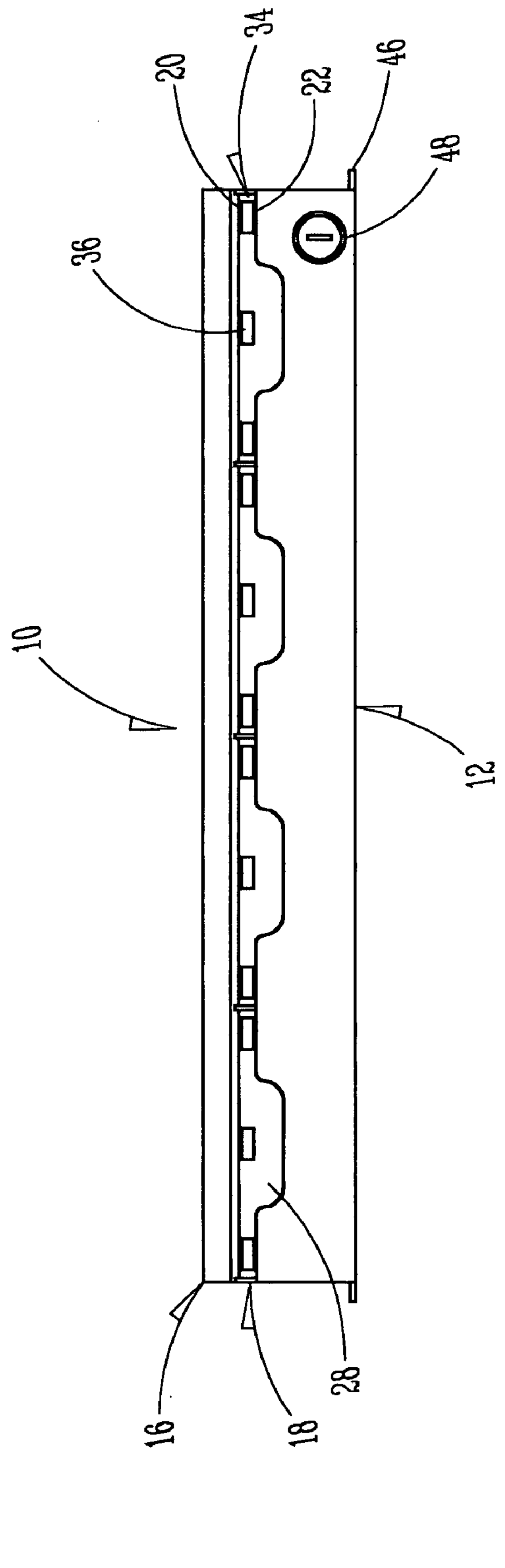
FIG. 4 is a front view in elevation of the ticket dispenser drawer of FIG. 1.

With reference to the drawings, a ticket dispenser in the form of a drawer that is the preferred embodiment of the present invention is disclosed at 10 in FIG. 1. The drawer 10 has a dispensing end 12 and an opposite end 14. At the dispensing end 12 is a ticket dispensing assembly 16. As best seen in FIG. 4, the ticket dispensing assembly 16 comprises a ticket dispensing slot 18 defined by an upper guide portion 20 and a lower guide portion 22. Referring back to FIG. 1, the drawer 10 contains a ticket holding bin 24, which has a floor 26, a front wall 28, a rear wall 30, and two side walls 32 and 32(*a*). Four of such bins 24 are in the preferred embodiment.

Figure 3:
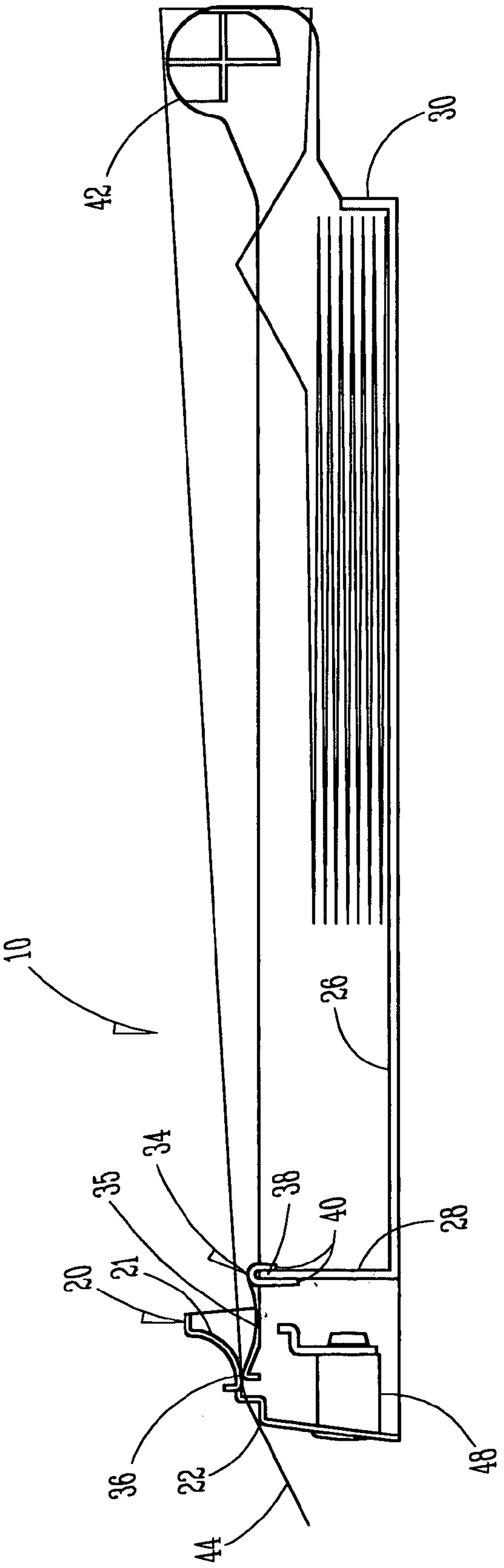
FIG. 3 is a side cross-sectional view in elevation of the ticket dispenser of FIG. 2.
Figure 5:
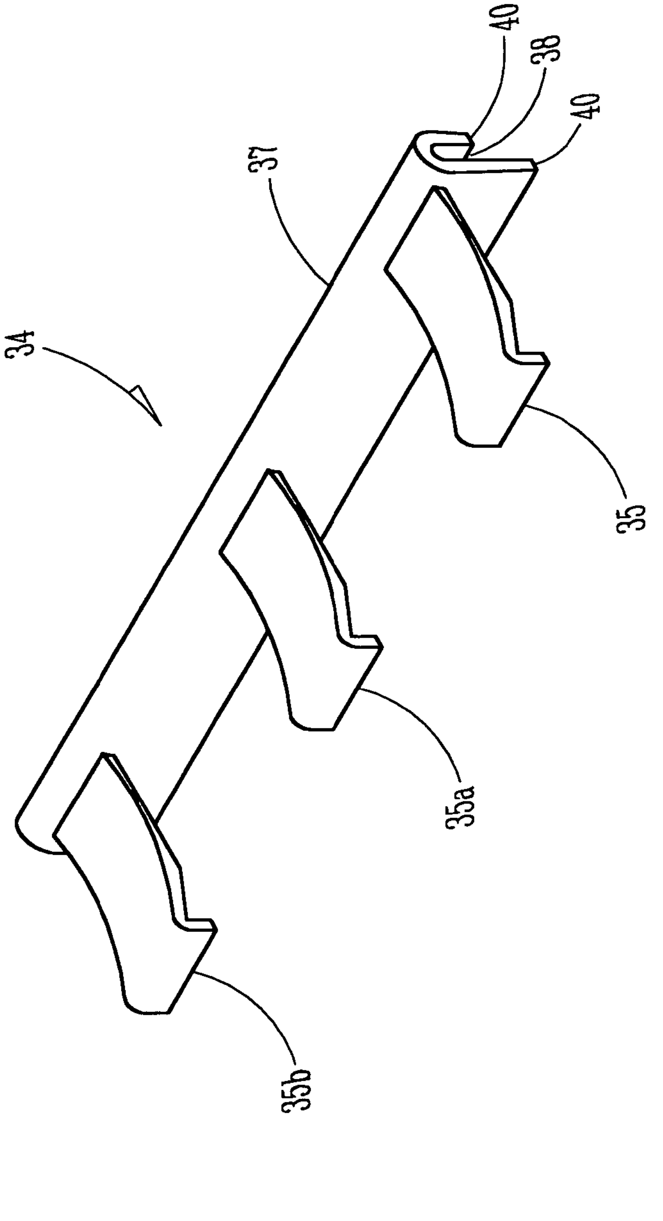
FIG. 5 is a side perspective view of the preferred embodiment of a tension arm assembly.

In the preferred embodiment, a tension arm assembly disclosed at 34 in FIG. 5 is removably attached to the front wall 28 of the bin 24. FIG. 3 shows the attachment. A resilient tension arm 35 extends from the tension arm assembly 34. In the preferred embodiment, three of such tension arms 35, 35(*a*) and 35(*b*) extend from the tension arm assembly 34. The tension arm assembly 34 has means for associating said tension arm with said front wall. In the preferred embodiment, said means comprises an elongated portion 37 and spaced apart sidewalls 40. The sidewalls 40 form a slot 38, in the elongated portion 37 of said tension arm assembly and the slot 38 frictionally engages front wall 28 as seen in FIG. 3.

As seen best in FIG. 3, a directing means 42 such as a curved elongated member or roller is positioned laterally across the opposite end 14 of the drawer 10. A plurality of series connected tickets 44 are stored in the bin 24 and are looped around said directing means 42 and then passed through the dispensing slot 18. As the tickets 44 pass over the tension arm 35, an outer edge 36 of said tension arm 35 presses said tickets 44 against said upper guide portion 20. This pressure controls the movement of tickets 44 through the dispensing slot 18 and inhibits movement of tickets 44 through the dispensing slot 18 as one or more of said tickets

44 are separated from the rest of said tickets 44. The tension arm 35 deflects as tickets 44 pass over it, allowing for tickets 44 of varying thicknesses to pass through the dispensing slot 18 without becoming stuck. In the preferred embodiment, the tension arm 35 is formed of acetal, which is a resilient, flexible, and inexpensive substance.

Another aspect of the preferred embodiment is the curvatures of the upper guide portion 20 and the tension arm 35. The upper guide portion 20 as shown in FIG. 3 comprises a bulge 21 toward the tickets 44 to guide the tickets 44 down and under the upper guide portion 20. The tension arm 35 is reciprocally shaped with a concave portion 37 facing the tickets 44 to guide the tickets 44 up and over the tension arm 35. As tickets 44 are fed into the dispensing slot 18, the bulge 21 and the concave portion 37 of the upper guide portion 20 and the tension arm 35, respectively, guide tickets 44.

Figure 6:
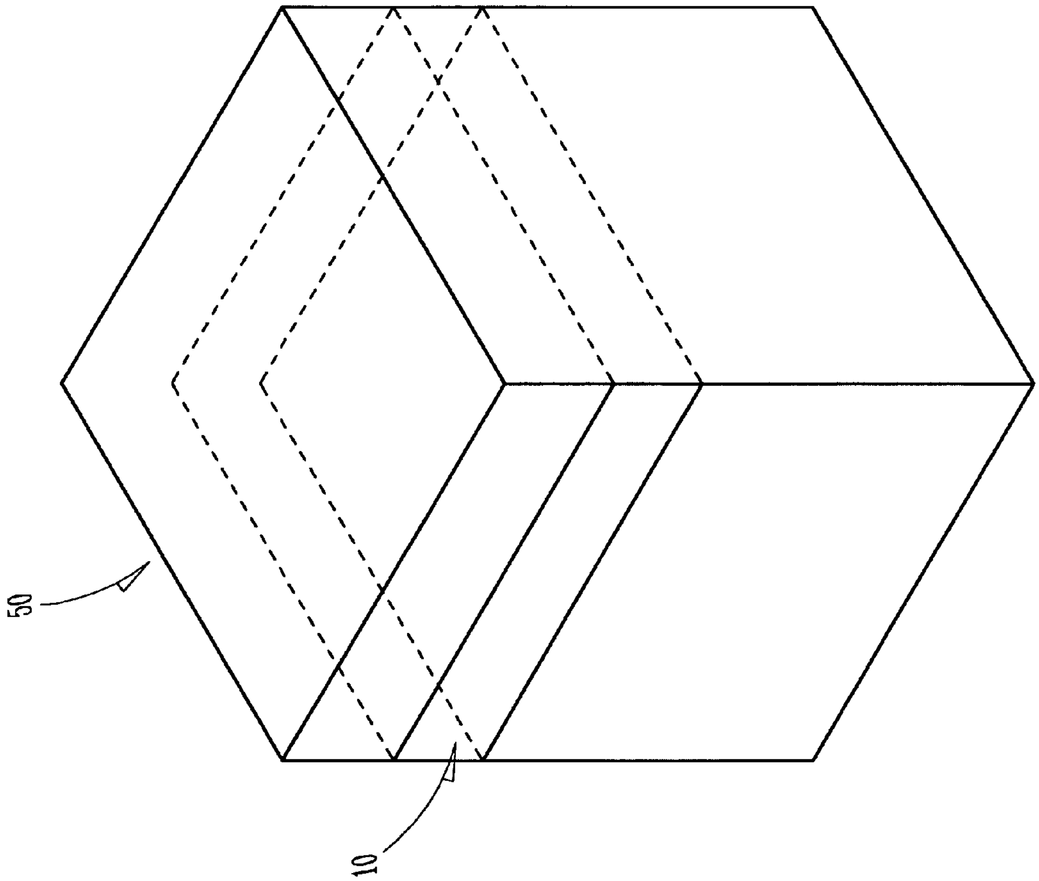
FIG. 6 is a side view in elevation of a drawer housing in which a plurality of the ticket dispensers of FIG. 1 may be housed.

The drawer is constructed such that it can be placed inside a drawer housing 50 as shown in FIG. 6. As seen in FIG. 1, protruding side edges 46 and 46(*a*) extend from the drawer 10. These side edges may be used to engage a reciprocal means in a drawer housing 50. The dispensing end 12 of the drawer 10 contains a lock 48 to secure the drawer 10 inside the drawer housing 50.

Thus, the present invention has been described in an illustrative manner. It is to be understood that the terminology that has been used is intended to be in the nature of words of description rather than of limitation.

Many modifications and variations of the present invention are possible in light of the above teachings. For example, the number of bins 24 and tension arms 35 may deviate from the preferred embodiment. Therefore, within the scope of the appended claims, the present invention may be practiced otherwise than as specifically described.

What is claimed is:

1. An apparatus for the storage, display and dispensing of tickets, said apparatus comprising:

(a) a drawer for storing a plurality of series connected tickets, said drawer including a dispensing end, and an opposite end;

(b) a ticket dispensing assembly located at the dispensing end of said drawer comprising a ticket dispensing slot, said slot including an upper guide portion and a lower guide portion through which said tickets are dispensed;

(c) at least one ticket holding bin in said drawer including:

i. a floor ii. a front wall behind the ticket dispensing slot ii. a rear wall iii. two sidewalls, and (d) at least one resilient tension arm to provide sufficient tension on the tickets being dispensed through said slot for controlling the tickets during separation thereof.

2. A dispensing apparatus as recited in claim 1, wherein said drawer holds a plurality of said ticket holding bins.

3. A dispensing apparatus as recited in claim 1, wherein said drawer includes at least four said ticket holding bins.

4. A dispensing apparatus as recited in claim 1, wherein said at least one tension arm comprises a generally concaved longitudinal axis and an outer edge such that said outer edge is positioned so as to engage said tickets relative to said upper guide portion of the dispensing slot.

5. A dispensing apparatus as recited in claim 1, wherein a plurality of said tension arms provide sufficient tension on the tickets being dispensed through said slot to provide control of said tickets during separation thereof.

6. A dispensing apparatus as recited in claim 4, wherein at least three of said tension arms are removably attached to the front wall of each of said ticket holding bins.

7. A dispensing apparatus as recited in claim 4, wherein the upper guide portion of the dispensing slot curves downwardly toward the exit of the dispensing slot to form a bulge facing toward the tickets and each said at least one tension arm curves upwardly toward the exit of the dispensing slot whereby the upper guide portion of the dispensing slot and each of said plurality of tension arms assists in guiding the tickets through the dispensing slot.

8. A dispensing apparatus as recited in claim 1, wherein said at least one tension arm is formed of a flexible material such that the tension arm temporarily deflects as said tickets are dispensed and allows tickets of varying thicknesses to pass through said dispensing slot.

9. A dispensing apparatus as recited in claim 1, wherein the drawer has at least two protruding side edges for attaching said drawer to a drawer housing.

10. A dispensing apparatus as recited in claim 1, wherein a directing means is located in said opposite end and said tickets are trained around said directing means.

11. A dispensing apparatus as recited in claim 1, wherein the drawer further comprises a lock whereby the drawer is securable to a drawer housing.

12. A dispensing apparatus as recited in claim 1, wherein said at least one tension arm extends from a tension arm assembly and said tension arm assembly comprises means for associating said tension arm with said at least one bin front wall.

13. A dispensing apparatus as recited in claim 12, wherein a plurality of tension arms extend from said tension arm assembly.

14. A dispensing apparatus as recited in claim 12, wherein said means for associating said tension arm with said front wall includes:

(a) an elongated portion with an attachment slot having spaced apart side walls that frictionally engage the front wall of the at least one bin; and (b) said at least one tension arm extends from said elongated portion.

15. A dispensing apparatus as recited in claim 14, wherein the attachment slot is narrower than the at least one bin front wall such that the side walls of the slot grip said at least one bin front wall.

16. A dispensing apparatus as recited in claim 14, wherein a plurality of said tension arms extend from said elongated portion of said frictionally engaged tension arm assembly.

17. A dispensing apparatus as recited in claim 14, wherein at least three of said tension arms extend from said elongated portion of said frictionally engaged tension arm assembly.

18. A dispensing apparatus as recited in claim 12, wherein said tension arm assembly and said tension arm are formed of one piece injection molded acetal.

19. A dispensing apparatus as recited in claim 12, further comprising a plurality of said tension arm assemblies wherein each of said plurality of said tension arm assemblies is removably attached to one of said ticket holding bin front walls.

20. A dispensing apparatus as recited in claim 19, wherein the number of said tension arm assemblies equals the number of said ticket holding bin front walls.

* * * * *